US007979364B2

(12) United States Patent
Hidai et al.

(10) Patent No.: US 7,979,364 B2
(45) Date of Patent: Jul. 12, 2011

(54) LEARNING CONTROL APPARATUS, LEARNING CONTROL METHOD, AND COMPUTER PROGRAM

(75) Inventors: Kenichi Hidai, Tokyo (JP); Kohtaro Sabe, Tokyo (JP)

(73) Assignee: Sony Corporation, Tokyo (JP)

( * ) Notice: Subject to any disclaimer, the term of this patent is extended or adjusted under 35 U.S.C. 154(b) by 80 days.

(21) Appl. No.: 12/357,917

(22) Filed: Jan. 22, 2009

(65) Prior Publication Data

US 2009/0138418 A1    May 28, 2009

Related U.S. Application Data

(62) Division of application No. 11/347,227, filed on Feb. 6, 2006, now abandoned.

(30) Foreign Application Priority Data

Feb. 23, 2005   (JP) ................................ 2005-047491
Jun. 9, 2005   (JP) ................................ 2005-169458

(51) Int. Cl.
*G06E 1/00*       (2006.01)
*G06F 15/18*    (2006.01)

(52) U.S. Cl. ............................ 706/12; 706/20; 706/16
(58) Field of Classification Search ........................ None
See application file for complete search history.

(56) References Cited

U.S. PATENT DOCUMENTS

2003/0074338 A1    4/2003   Young et al.

OTHER PUBLICATIONS

Ogino et al., M., "Reinforcement Learning of Humanoid Rhythmic Walking Parameters based on Visual Information", Advanced Robotics, vol. 18, No. 7, 2004.*
Whitehead et al., S., "Learning to Perceive and Act by Trial and Error", Machine Learning 7, 45-83, 1991.*
Doya et al., Multiple Model-based Reinforcement Learning, Human Information Science Laboratories, ATR International, Nov. 2, 2001.*
Russell et al., S., "Local learning in probabilistic networks with hidden variables", International Joint Conference on Artificial Intelligence, vol. 14, No. 2, p. 1146-1152, 1995.*
Jun Tani, "Learning to generate articulated behavior through the bottom-up and the top-down interaction processes", Neural Networks, Elsevier Science Publishers, vol. 16, No. 1, XP004405399, Jan. 1, 2003, 7 pages.
Bacciu et al., D., "A RLWPR Network for Learning the Internal Model of an Anthropomorphic Robot Arm", IEEE, 2004.
Doya et al., Kenji, "Multiple Model-based Reinforcement Learning", Jun. 2000.

* cited by examiner

*Primary Examiner* — Jeffrey A Gaffin
*Assistant Examiner* — Adrian L Kennedy
(74) *Attorney, Agent, or Firm* — Oblon, Spivak, McClelland, Maier & Neustadt, L.L.P.

(57) ABSTRACT

A learning control apparatus for an autonomous agent including a functional module having a function of multiple inputs and multiple outputs, the function receiving at least one variable and outputting at least one value, includes an estimating unit for estimating a causal relationship of at least one variable, a grouping unit for grouping at least one variable into a variable group in accordance with the estimated causal relationship, a determining for determining a behavior variable corresponding to each of the variable groups, and a layering unit for layering, in accordance with the variable group and the behavior variable, the function corresponding to each variable group, the function receiving the variable grouped into the variable group and outputting the behavior variable.

7 Claims, 10 Drawing Sheets

```
set of variables S={s₁, s₂,..., s_N}.
integer n=1.
for i=1 to N
    variable group X_n={S_i}.
    remove s_i from S.
    if S is empty set, algorithm ends.
    for j=i+1 to N
        if s_i and s_j are mutually cause variables to each other,
            s_j is added to x_n and s_j is removed from S.
    end
    n=n+1
end
```

| VARIABLES TO BE CONTROLLED | CAUSE VARIABLES | BEHAVIOR VARIABLES |
| --- | --- | --- |
| $\theta, \omega$ | $\theta: \{\theta, \omega, \tau\}$<br>$\omega: \{\theta, \omega, \tau\}$ | $\tau$ |
| E | $\{\theta, \tau\}$ | $\{\theta, \omega\}$<br>$\tau$ |
| L | $\{\tau\}$ | $\tau$ |

FIG. 8

| VARIABLES TO BE CONTROLLED | CAUSE VARIABLES | BEHAVIOR VARIABLES | STATE VARIABLES |
|---|---|---|---|
| $\theta, \omega$ | $\theta : \{\theta, \omega, \tau\}$<br>$\omega : \{\theta, \omega, \tau\}$ | $\tau$ | $\{\theta, \omega\}$ |
| E | $\{\theta, \tau\}$ | $\dfrac{\{\theta, \omega\}}{\tau}$ | $\{\theta, \omega\}$ |
| L | $\{\tau\}$ | $\tau$ | $\{\}$ |

LEARNING CONTROL APPARATUS, LEARNING CONTROL METHOD, AND COMPUTER PROGRAM

CROSS REFERENCES TO RELATED APPLICATIONS

This application is a Division of and claims the benefit of priority under 37 U.S.C. §120 from U.S. Ser. No. 11/347,227, filed Feb. 6, 2006, now abandoned, and claims the benefit of priority under 35 U.S.C. §119 from Japanese Patent Application JP 2005-047491 filed in the Japanese Patent Office on Feb. 23, 2005, and Japanese Patent Application JP 2005-169458 filed in the Japanese Patent Office on Jun. 9, 2005, the entire contents of which are incorporated herein by reference.

BACKGROUND OF THE INVENTION

1. Field of the Invention

The present invention relates to a learning control apparatus, a learning control method, and a computer program. More particularly, the present invention relates to a learning control apparatus, a learning control method, and a computer program for an autonomous learning agent having multiple dimensional variables (sensor input, internal state, and motor output), the autonomous learning agent estimating a causal relationship between variables based on learning of a predictor, and automatically determining the number of controllers, functions, and input and output variables based on the estimated causal relationship in order to automate modularization and layering of the controllers.

2. Description of the Related Art

Structure of an autonomous agent using reinforcement learning is disclosed by Richard S. Sutton, and Andrew G. Barto in the book entitled "Reinforcement Learning: An Introduction" MIT Press, 1998. Experience-reinforced autonomous agent is disclosed by Jun Tani in the paper entitled "Learning to generate articulated behavior through the bottom-up and the top-down interaction processes", Neural Networks, Vol. 16, No. 1, pp. 11-23, 2003. In these disclosed techniques, input and output variables of a learner are manually selected by humans who take into consideration a task to be solved and an expected behavior.

As for multi-degree-of-freedom agent, if a task and input and output variables are determined during design phase, learning capability of the agent is limited from the design phase. The known techniques are thus subject to serious problem in the construction of an open-ended autonomous agent.

If all conceivable sensor and motor variables are used as inputs and outputs to solve the manual selection problem, performance in individual task and expected behavior is affected. This is well known as curse of dimensionality in the field of machine learning (as disclosed by R. E. Bellman, in the book entitled "Dynamic Programming" Princeton University Press, Princeton. 6: 679-684).

To overcome this problem, an autonomous agent is segmented in a plurality of functional modules in learning. However, this process leads to two new problems which do not exist if learning is performed with a single functional module.

A first problem is how to determine the number of functional modules and the degree of freedom of each module (a quantity for determining how complex structure one module is allowed to have). A second problem is how a link between modules is determined.

MOSAIC disclosed in Japanese Unexamined Patent Application Publication No. 2000-35804 is interesting in terms of function modularization. However, each module needs to handle all variables as inputs and outputs, and MOSAIC thus fails to overcome the two new problems. To overcome the two new problems, humans need to design beforehand a link with the functions of the modules. MOSAIC remains unchanged from a design approach incorporated in the known autonomous agent.

SUMMARY OF THE INVENTION

To overcome the drawback of MOSAIC, it is contemplated to automatically learn the function of each functional module and the link thereof. In such a case, a method of determining the number of modules and the complexity of each module is not known, and there is room for human intervention. Any case that a plurality of tasks and a plurality of expected behaviors are additionally learned in a non-destructive fashion has never been reported.

According to brain science, neural science, and psychology, humans are believed to have modularity of function (localized function). There is an argument that some modularity and layer structure be introduced in learning of artificial autonomous agent. No complete methods to link and integrate modules and layers have not been established as disclosed by G. Taga in the book entitled "Dynamic design of brain and body, and non-linear dynamics and development of motion and perception," Kanekoshobo, 2002.

It is thus desirable to provide an autonomous learning agent having multiple dimensional variables (sensor input, internal state, and motor output), the autonomous learning agent estimating a causal relationship between variables based on learning of a predictor, and automatically determining the number of controllers, functions, and input and output variables based on the estimated causal relationship in order to automate modularization and layering of the controllers.

A learning control apparatus of one embodiment of the present invention includes an estimating unit for estimating a causal relationship of at least one variable, a grouping unit for grouping at least one variable into a variable group in accordance with the estimated causal relationship, a first determining unit for determining a behavior variable corresponding to each of the variable groups, and a layering unit for layering, in accordance with the variable group and the behavior variable, the function corresponding to each variable group, the function receiving the variable grouped into the variable group and outputting the behavior variable.

The learning control apparatus further includes a second determining unit for determining a state variable corresponding to each variable group.

A learning control method of another embodiment of the present invention includes steps of estimating a causal relationship of at least one variable, grouping at least one variable into a variable group in accordance with the estimated causal relationship, determining a behavior variable corresponding to each of the variable groups, and layering, in accordance with the variable group and the behavior variable, the function corresponding to each variable group, the function receiving the variable grouped into the variable group and outputting the behavior variable.

A computer program of another embodiment of the present invention includes steps of estimating a causal relationship of at least one variable, grouping at least one variable into a variable group in accordance with the estimated causal relationship, determining a behavior variable corresponding to each of the variable groups, and layering, in accordance with the variable group and the behavior variable, the function corresponding to each variable group, the function receiving the variable grouped into the variable group and outputting the behavior variable.

In accordance with embodiments of the present invention, the causal relationship of at least one variable is estimated. At least one variable is grouped into variable groups in accordance with the estimated causal relationship. The behavior variable corresponding to the variable group is determined. The function corresponding to each variable group is layered in accordance with the variable group and the behavior variable, the function receiving the variable grouped into the variable group and outputting the behavior variable.

In accordance with embodiments of the present invention, an autonomous learning agent having multiple dimensional variables (sensor input, internal state, and motor output), estimates a causal relationship between variables based on learning of a predictor, automatically determines the number of controllers, functions, and input and output variables based on the estimated causal relationship, and automates designing of modularization and layering of the controllers.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

A learning control apparatus (for example, an autonomous controller 36 of FIG. 3) of one embodiment of the present invention includes an estimating unit (for example, a predictor learner 41 of FIG. 3) for estimating a causal relationship of at least one variable, a grouping unit (for example, a variable group generator 42 of FIG. 3) for grouping at least one variable into a variable group in accordance with the estimated causal relationship, a first determining unit (for example, a behavior variable determiner 43 of FIG. 3) for determining a behavior variable corresponding to each of the variable groups, and a layering unit (for example, a layering unit 45 of FIG. 3) for layering, in accordance with the variable group and the behavior variable, the function corresponding to each variable group, the function receiving the variable grouped into the variable group and outputting the behavior variable.

The learning control apparatus further includes a second determining unit (for example, a state variable determiner 44 of FIG. 3) for determining a state variable corresponding to each variable group.

A learning control method of another embodiment of the present invention includes steps of estimating a causal relationship of at least one variable (for example, in step S1 of FIG. 10), grouping at least one variable into a variable group in accordance with the estimated causal relationship (for example, in step S2 of FIG. 10), determining a behavior variable corresponding to each of the variable groups (for example, in step S3 of FIG. 10), and layering, in accordance with the variable group and the behavior variable, the function corresponding to each variable group (for example, in step S5 of FIG. 10), the function receiving the variable grouped into the variable group and outputting the behavior variable.

A computer program of one embodiment of the present invention includes the same elements as the above-referenced learning control method, and the discussion thereof is omitted herein.

The embodiments of the present invention are described below with reference to the drawings.

Figure 1:
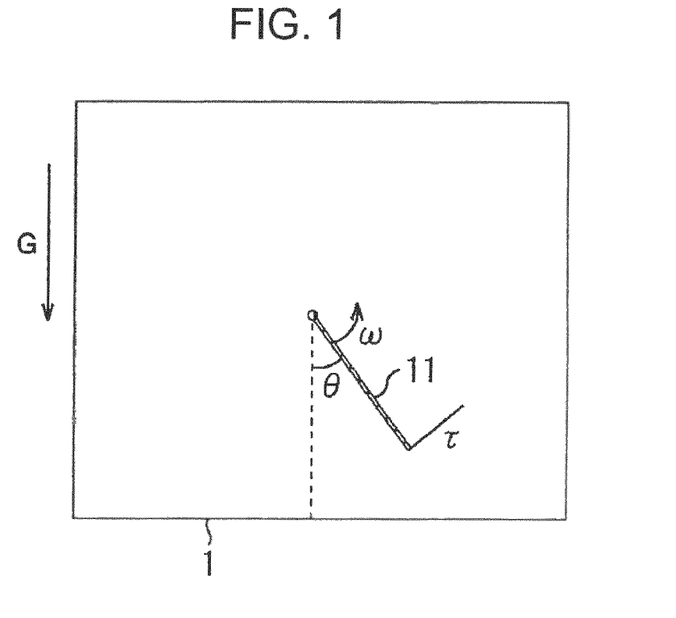
FIG. 1 illustrates an autonomous agent.

FIG. 1 illustrates a configuration of an autonomous agent 1 in accordance with one embodiment of the present invention. The autonomous agent 1 is a simple robot having a single joint, and a link 11 rotated with torque $\tau$ applied to the joint. The autonomous agent 1 detects, as inputs, an angle $\theta$ and an angular velocity $\omega$ of the link 11, and outputs the torque $\tau$ applied to the joint. Gravity (in a direction of $\theta=0$) is also present in an environment containing the autonomous agent 1. Torque $\tau$ that can be applied is weaker than the force of gravity. Even if a maximum torque $\tau_{max}$ is applied in one direction, the autonomous agent 1 is neither lifted nor moved.

Figure 2:
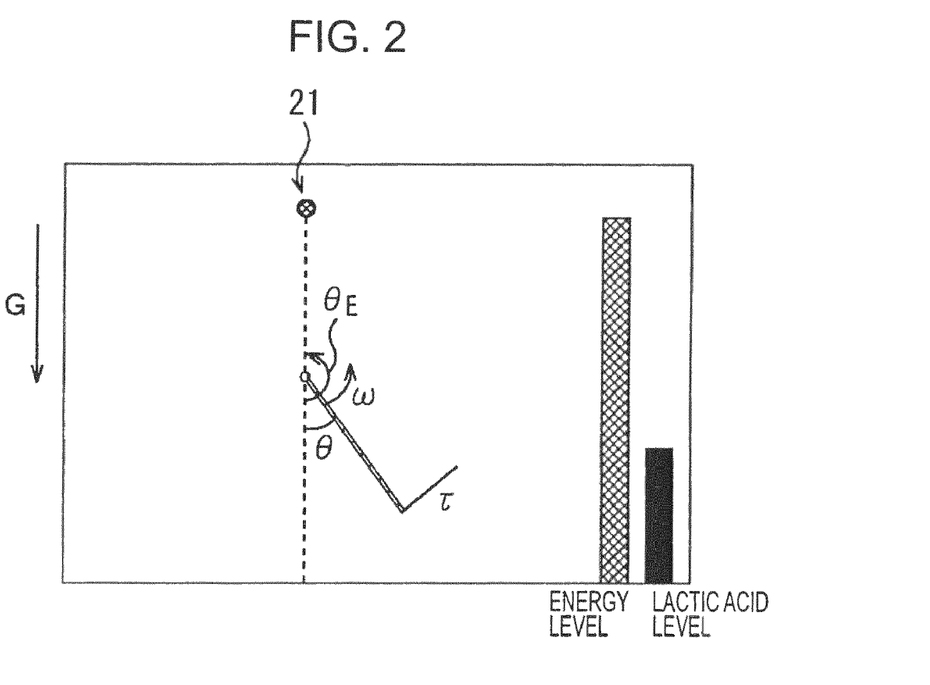
FIG. 2 illustrates an internal state of the autonomous agent.

The autonomous agent 1 contains energy E and lactic acid L as variable representing internal states as shown in FIG. 2. The energy E is consumed (decreased) in proportion to a developed torque $\tau$. When the link 11 reaches a predetermined position $\theta_E$ where a bait 21 of the autonomous agent 1 is placed, the energy E increases by a predetermined amount. The lactic acid L increases in proportion to the consumed energy E while being reduced constantly by a small amount as a result of decomposition at the same time. The autonomous agent 1 becomes unable to develop torque $\tau$ when the energy E is fully consumed or when the lactic acid L is maximized.

Figure 3:
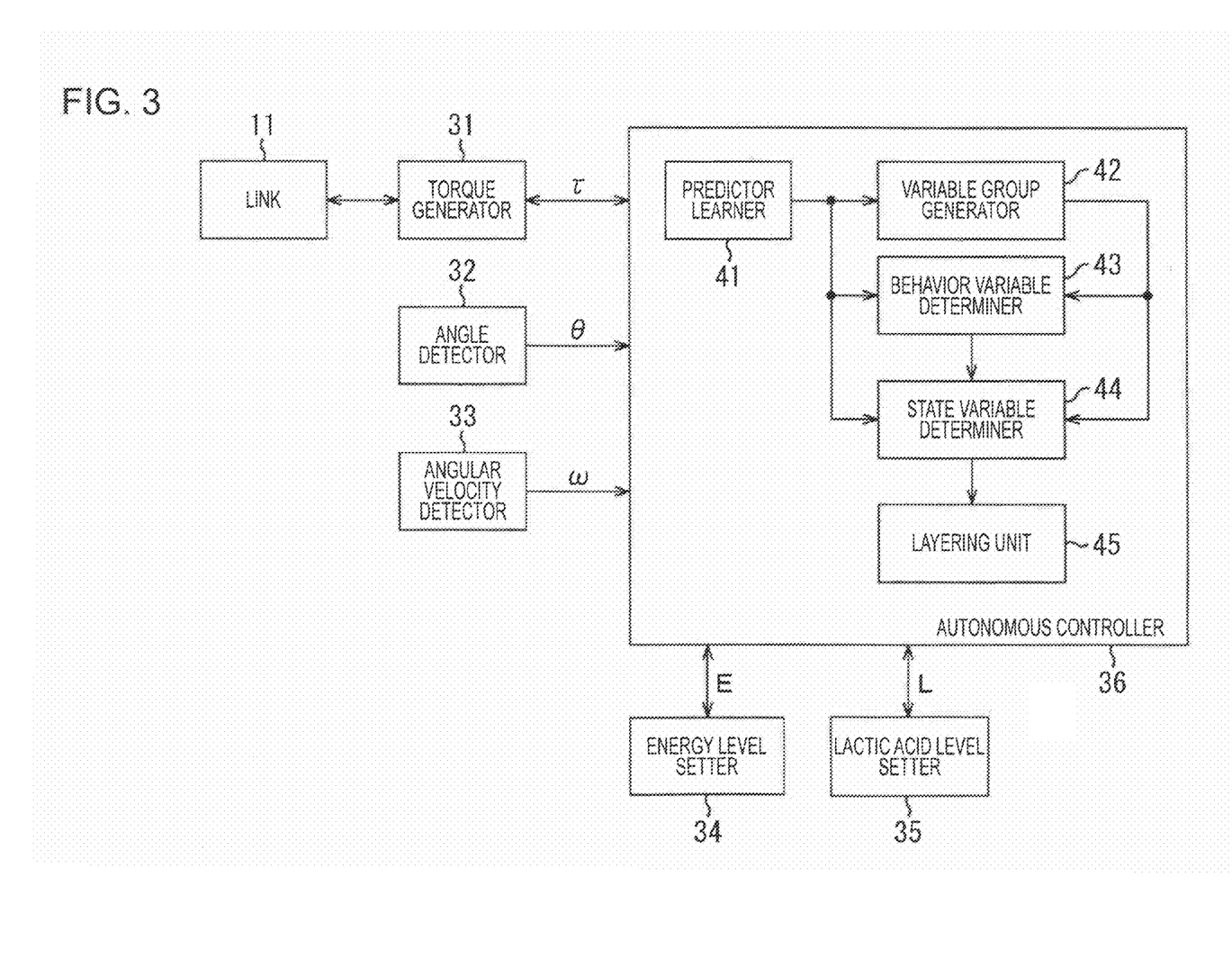
FIG. 3 is a block diagram of the internal structure of the autonomous agent.

FIG. 3 illustrates an internal structure of the autonomous agent 1.

A torque generator 31 includes a motor and moves the link 11 by developing torque (rotation moment) τ, and notifies an autonomous controller 36 of the developed torque τ. The angle detector 32 detects an angle θ made by the link 11 with respect to a vertically aligned line, and notifies the autonomous controller 36 of the detected angle θ. An angular velocity detector 33 detects an angular velocity ω of the link 11 and notifies the autonomous controller 36 of the detected angular velocity ω. An energy level setter 34 reduces the energy E in response to the torque τ developed by the torque generator 31 while increasing the energy E in response to the angle θ detected by the angle detector 32. A lactic acid level setter 35 increases the lactic acid L in response to the energy E that is consumed (reduced) in response to the torque τ developed by the torque generator 31 while reducing the lactic acid L with a predetermined period. The autonomous controller 36 is notified of the current level of the energy E.

A predictor learner 41 in the autonomous controller 36 acquires differential equations (1) to be discussed later, by learning each of variables (θ, ω, E, L, τ), and outputs the differential equations (1) to each of a variable group generator 42, a behavior variable determiner 43, and a state variable determiner 44. The variable group generator 42 groups variables that serve as a cause to each other, from among the variables (θ, ω, E, L, τ) in accordance with the differential equations (1) acquired by the predictor learner 41, and outputs the resulting variable groups to the behavior variable determiner 43 and the state variable determiner 44. The behavior variable determiner 43 determines a behavior variable corresponding to each variable group in accordance with the differential equations (1) acquired by the predictor learner 41 and the variable group input by the variable group generator 42. The state variable determiner 44 determines a state variable corresponding to each variable group in accordance with the differential equations (1) acquired by the predictor learner 41, the variable group input by the variable group generator 42, and the behavior variable determined by the behavior variable determiner 43. The state variable determiner 44 then outputs the state variable together with the behavior variable to a layering unit 45. The layering unit 45 generates a controller corresponding to a combination of the variable group and the behavior variable, in accordance with the behavior variable and the state variable of the variable group, and layers the generated controller.

The differential equations (1) are applied a dynamic model of the autonomous agent 1. However, a specific content of each function f is not discussed herein.

$$\dot{\theta}=f_\theta(\theta, \omega, \tau)$$

$$\dot{\omega}=f_\omega(\theta, \omega, \tau)$$

$$\dot{E}=f_E(\theta, \tau)$$

$$\dot{L}=f_L(\tau) \quad (1)$$

The dynamic model of the autonomous agent 1 can also be expressed by difference equations (2) using current time t, and infinitesimal time Δt:

$$\theta_{t+\Delta t}-\theta_t=f_\theta(\theta_t, \omega_t, \tau_t)$$

$$\omega_{t+\Delta t}-\omega_t=f_\omega(\theta_t, \omega_t, \tau_t)$$

$$E_{t+\Delta t}-E_t=f_E(\theta_t, \tau_t)$$

$$L_{t+\Delta t}-L_t=f_L(\tau_t) \quad (2)$$

Figure 4:
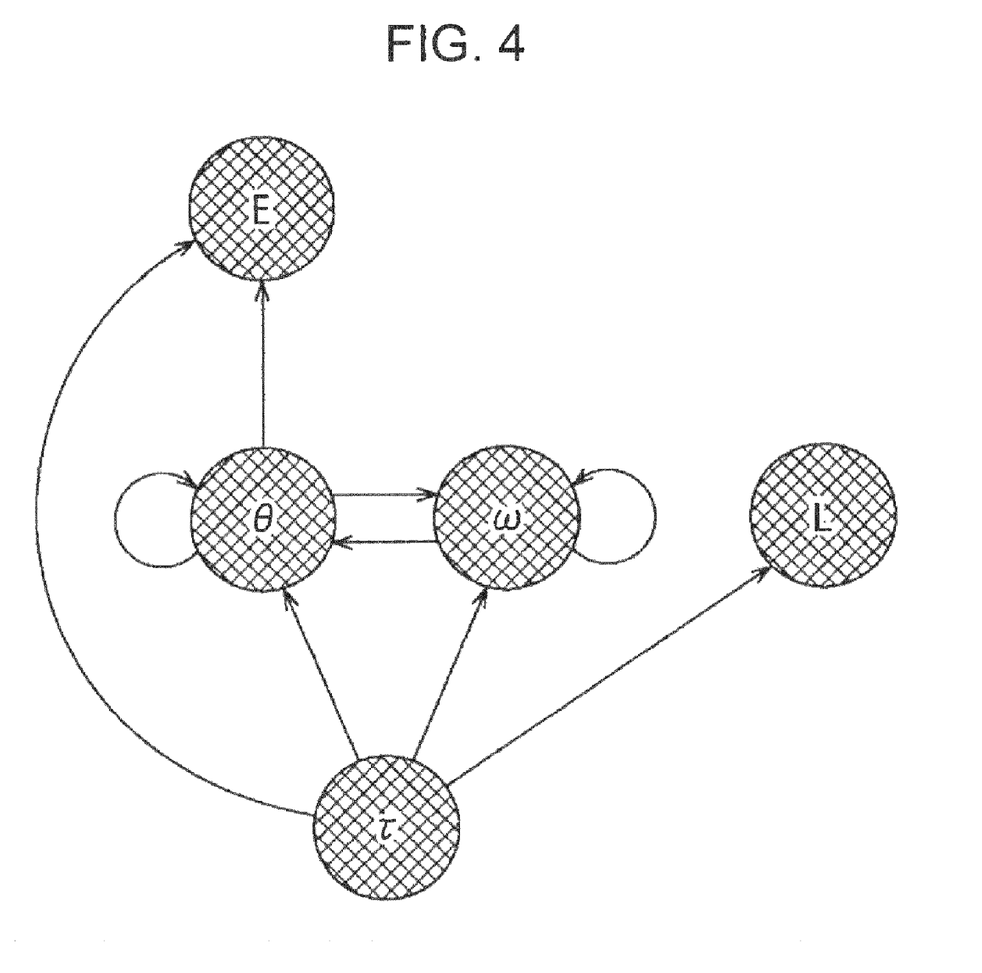
FIG. 4 is a causal block diagram of the autonomous agent.

FIG. 4 illustrates the dynamic model of the autonomous agent 1 represented in causal diagram.

The difference equations (2) are more practical than the differential equations (1) in view of computerization. For simplicity of explanation, the differential equations (1) are considered herein. The differential equations (1) may be replaced with the difference equations (2) in the following discussion. A function f contained in the differential equations (1) is referred to as a "predictor" as appropriate.

The predictor learner 41 restores approximately the difference equation with the difference equations (2) of the dynamic model and the causal diagram unknown. This process includes a first process (restoration of the causal diagram) for finding a qualitative causal relationship of the variables and a second process (restoration of the function f) for learning approximately a quantitative causal relationship subsequent to the first process. Information obtained as a clue is time-series values of all variables (θ, ω, E, L, τ).

The first process corresponds to determining a cause of a motion of an object when a human predicts the motion of the object. In prediction, the human picks up some events from a numerous number of events in the world, and understands (finds) the cause of the object. Information to be used then is time-series information of events (variables) obtained through observing an environment.

Since information relating to the causal relationship is not used in known machine learning, all variables are handled as inputs to a predictor as represented in equation (3):

$$\dot{\theta}=f_\theta(\theta, \omega, E, L, \tau)$$

$$\dot{\omega}=f_\omega(\theta, \omega, E, L, \tau)$$

$$\dot{E}=f_E(\theta, \omega, E, L, \tau)$$

$$\dot{L}=f_L(\theta, \omega, E, L, \tau) \quad (3)$$

If the above-described known method is used, the number of training samples (time-series values of variables) required for learning increases as the number of variables increases. As a result, a state that makes learning difficult in practice results (this state is referred to as "curse of dimensionality").

The predictor learner 41 thus selectively discards variables of the function f. In one method, combinations of variables as inputs are generated as a plurality of hypotheses, and a hypothesis having a minimum predictive error is selected. For example, a function $f_\theta$ of a hypothesis predicting an angle θ is represented by equations (4):

$$\dot{\theta}=f_\theta(\bullet) \quad \dot{\theta}=f_\theta(\theta, \omega, \tau)$$

$$\dot{\theta}=f_\theta(\theta) \quad \dot{\theta}=f_\theta(\theta, \omega, E, L)$$

$$\dot{\theta}=f_\theta(\theta, \omega) \quad \dot{\theta}=f_\theta(\theta, \omega, E, L, \tau) \quad (4)$$

Equations (4) are part of functions θ of the contemplated hypotheses.

If all combinations from function $f_\theta(\bullet)$ with no input variable at all incorporated to function $f_\theta(\theta, \omega, E, L, \tau)$ with all variables incorporated are summed up, 121 (=5×4×3×2+1) combinations are possible with the number of variables being 5. With this arrangement, the number of combinations explosively increases as the number of variables increases. An upper limit should be imposed on the number of combinations.

In the second process, after a function f as a hypothesis is determined, function approximation is performed with the same training sample (time-series information of the events (variables) obtained through observing an environment) applied to the function f as the hypothesis.

Any method may be used in function approximation. Learning herein is performed using support vector regression (SVR). The SVR guarantees that a global solution is usually obtained, and is more reliably used than a neural network error back propagation method widely used.

The structure of the function f is determined on a per hypothesis basis in learning using SVR. How good prediction each hypothesis performs is evaluated based on an evaluation sample different from the training sample. This method is used to determine a generalization error corresponding to prediction performance, and referred to as "cross validation". Although any other evaluation criteria may be used, the evaluation method must determine generalization error rather than training error. When a hypothesis providing the best evaluation is selected, equations (1) are obtained if learning has been successful.

Approximate learning of the dynamic model is performed using the above-referenced process. As described below, information (relating to causal relationship) indicating that prediction is possible with which variable is set to any variable as a cause variable is important.

For example, changing the value of one variable to any predetermined value is now desired. If no direct intervention to that variable is possible, an indirect intervention to a variable other than that variable is contemplated. For example, one cannot move a position of an object (a chair, for example) by thinking only, but can constrict muscles of one's own. By directly constricting muscles, one can control one's own body, thereby changing the position of the object after all.

The autonomous agent 1 is considered. The autonomous agent 1 cannot directly increase the energy E even if the energy E is reduced. In contrast, torque $\tau$ is a variable directly manipulable. The energy E can be indirectly increased by manipulating the torque $\tau$. A functional module operating using the causal relationship between variables is hereinafter referred to as a "controller."

As the predictor, the controller is represented by a function. Let "x" represent a variable to be controlled, "s" represent a state variable, and "a" represent a variable used in intervention (behavior variable), and the controller (function) $g_x$ is expressed by equation (5):

$$a = g_x(x, s) \quad (5)$$

In equation (5), "x", "s", and "a", representing variables, are sets of variables in practice, and may be interpreted as vectors. More specifically, "x" is a vector having at least one element, "s" is a vector having at least zero element, and "a" is a vector having at least one element. If the number of element is zero, no variable is used. If the number of element is one, a single variable is used (namely, a scalar quantity).

To produce a controller controlling a predetermined variable, it is necessary to assign "x", "s", and "a" to respective variables. If "x", "s", and "a" are assigned to all variables without consideration, the "curse of dimensionality" problem may arise again.

Figure 5:
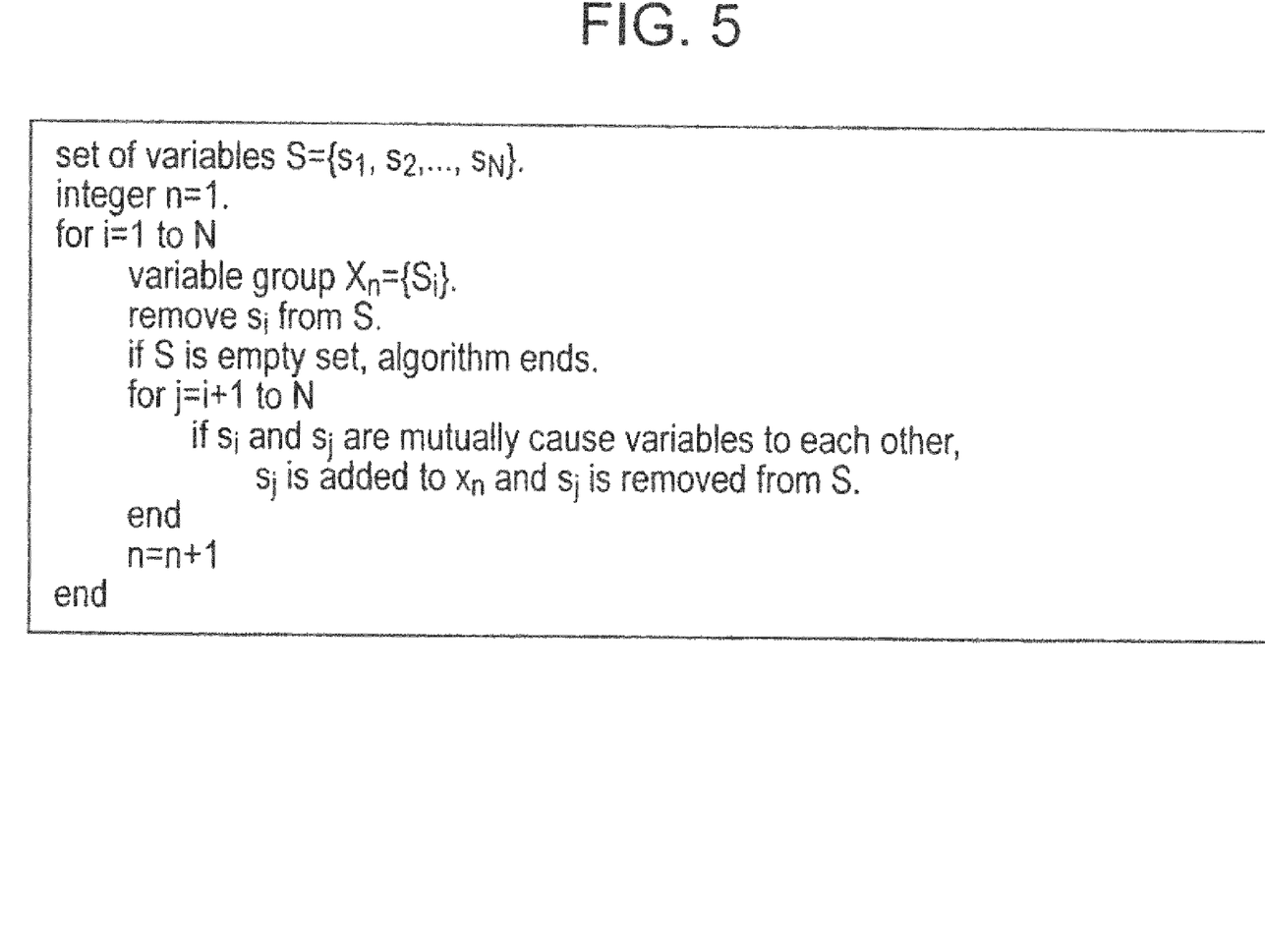
FIG. 5 illustrates an algorithm for generating a variable group.

If a plurality of variables are mutually cause variables to each other, it is considered that these variables essentially express a single event. In such a case, even if an attempt is made to vary any single variable from among the plurality of variables, that attempt may fail. It is necessary to control variables mutually being a cause variable to each other in a group. A set of variables mutually being a cause variable to each other is hereinafter referred to as a variable group. A variable group $x_n$ (n=1, 2, . . . , N) is generated using an algorithm of FIG. 5. Variables being not a cause variable to each other may be respectively regarded as a variable group composed of a single variable.

In the above-described autonomous agent 1, the angle $\theta$ and the angular velocity $\omega$ are mutually cause variables. For this reason, if an attempt is made to control the angle $\theta$ only or the angular velocity $\omega$ only, a controller performing successfully a control process cannot be learned. The angle $\theta$ and the angular velocity $\omega$ are handled as a single variable group and a controller $\theta\omega$ that simultaneously controls the angle $\theta$ and the angular velocity $\omega$ needs to be considered.

By grouping the variables, a variable x to be controlled is determined from among the above-described "x", "s", and "a". In the autonomous agent 1, three control variable groups $X_1$, $X_2$, and $X_3$ represented by the following equations (6) are determined.

$$X_1 = \{\theta, \omega\}$$

$$X_2 = \{E\}$$

$$X_3 = \{L\} \quad (6)$$

Figure 6:
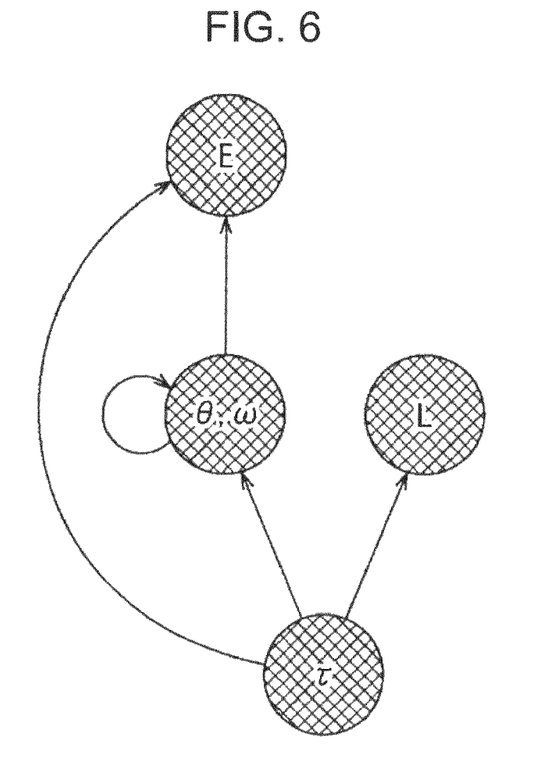
FIG. 6 is a causal diagram subsequent to grouping variables.

FIG. 6 is a causal diagram of the variables subsequent to grouping.

A controller is constructed to each variable group after determining the variable group to be controlled. A behavior variable serving as an output of the controller $g_x$ is considered. A variable that can be a behavior variable is only a controllable variable. Controllable variables are divided into two types. One type includes innate behavior variables to be controllable through direct intervention. The other type includes variables that become controllable through learning of the controller.

There is freedom remains as to which combination to select from the behavior variables as candidate. Combinations of all variables are concurrently generated as hypotheses. All combinations are learned, and any of the combinations is freely selected and used during an actual behavior. This operation is apparently redundant and unnecessary freedom, but may be considered as a useful freedom, because behavior selection in planning algorithm A* is interpreted as selection of hypothesis of the controller.

More specifically, the cause variable of variables to be controlled belonging to each variable group is acquired from a learned predictor to generate a cause variable set. A variable to be controlled is excluded from the cause variable set, and a variable remaining in the cause variable set is set as a behavior variable. If the behavior variable belongs to the variable group, all variables belonging to the variable group are set to be behavior variables.

For example, as for a variable group $\{\theta, \omega\}$, cause variables $\{\theta, \omega, \tau\}$ of a variable $\theta$ belonging to the variable group and cause variables $\{\theta, \omega, \tau\}$ of a variable $\omega$ to be controlled are acquired, and a cause variable set $\{\theta, \omega, \tau\}$ is generated. The variables $\theta$ and $\omega$ are removed from the cause variable set $\{\theta, \omega, \tau\}$, and the remaining variable $\tau$ is a behavior variable.

As for a variable group $\{E\}$, cause variables $\{\theta, \tau\}$ of a variable E belonging to the variable group are acquired, and a cause variable set $\{\theta, \tau\}$ is generated. The variable E to be controlled is excluded from the cause variable set $\{\theta, \tau\}$ (although the variable E to be controlled is not contained in the cause variable set $\{\theta, \tau\}$), and the remaining variables $\theta$ and $\tau$ become behavior variables. Since the variable $\theta$ belongs to the variable group $\{\theta, \omega\}$, the variable group $\{\theta, \omega\}\}$ becomes the behavior variables.

As for a variable group $\{L\}$, the cause variable $\tau$ of a variable L to be controlled belonging to the variable group is acquired, and a cause variable set $\{\tau\}$ is generated. The variable L to be controlled is excluded from the cause variable set $\{\tau\}$ (although the variable L to be controlled is not contained in the cause variable set $\{\tau\}$ in practice), and the remaining $\tau$ becomes a behavior variable.

Figure 7:
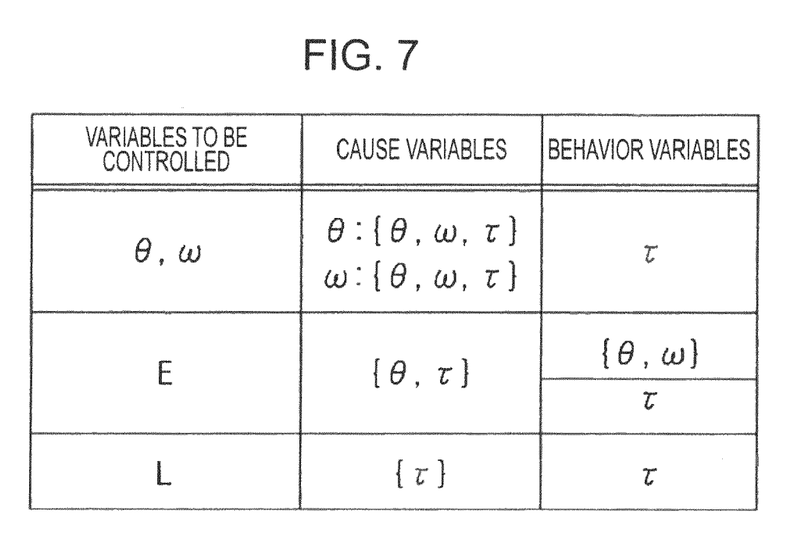
FIG. 7 illustrates a behavior variable corresponding to a variable to be controlled (variable group)

FIG. 7 illustrates the above-referenced autonomous agent 1.

Subsequent to the determination of the behavior variable of the variable group to be controlled, a state variable corresponding to the behavior variable is determined. More specifically, variables obtained by subtracting directly intervenable behavior variables from the cause variable group are state variables. If a state variable belongs to a variable group, all variables belonging to the variable group are set to be state variables.

Figure 8:
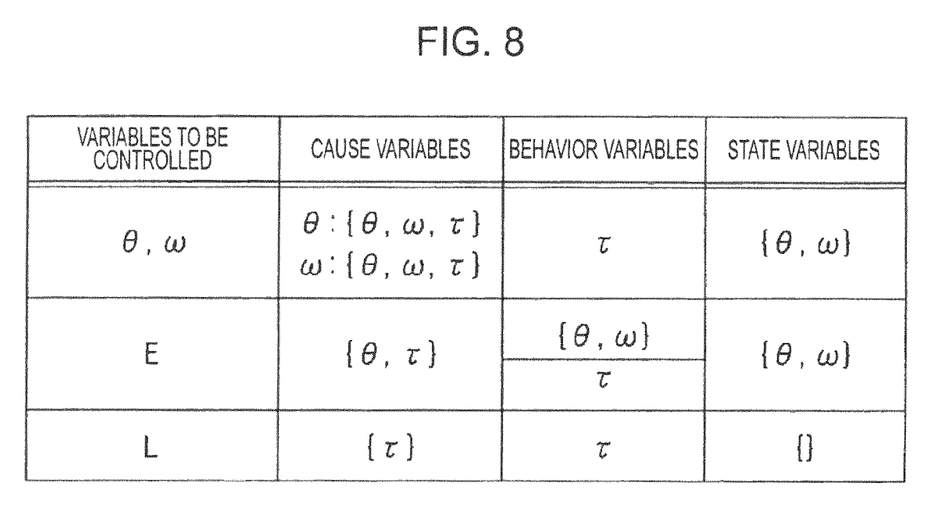
FIG. 8 illustrates a behavior variable corresponding to a variable to be controlled (variable group)
Figure 9:
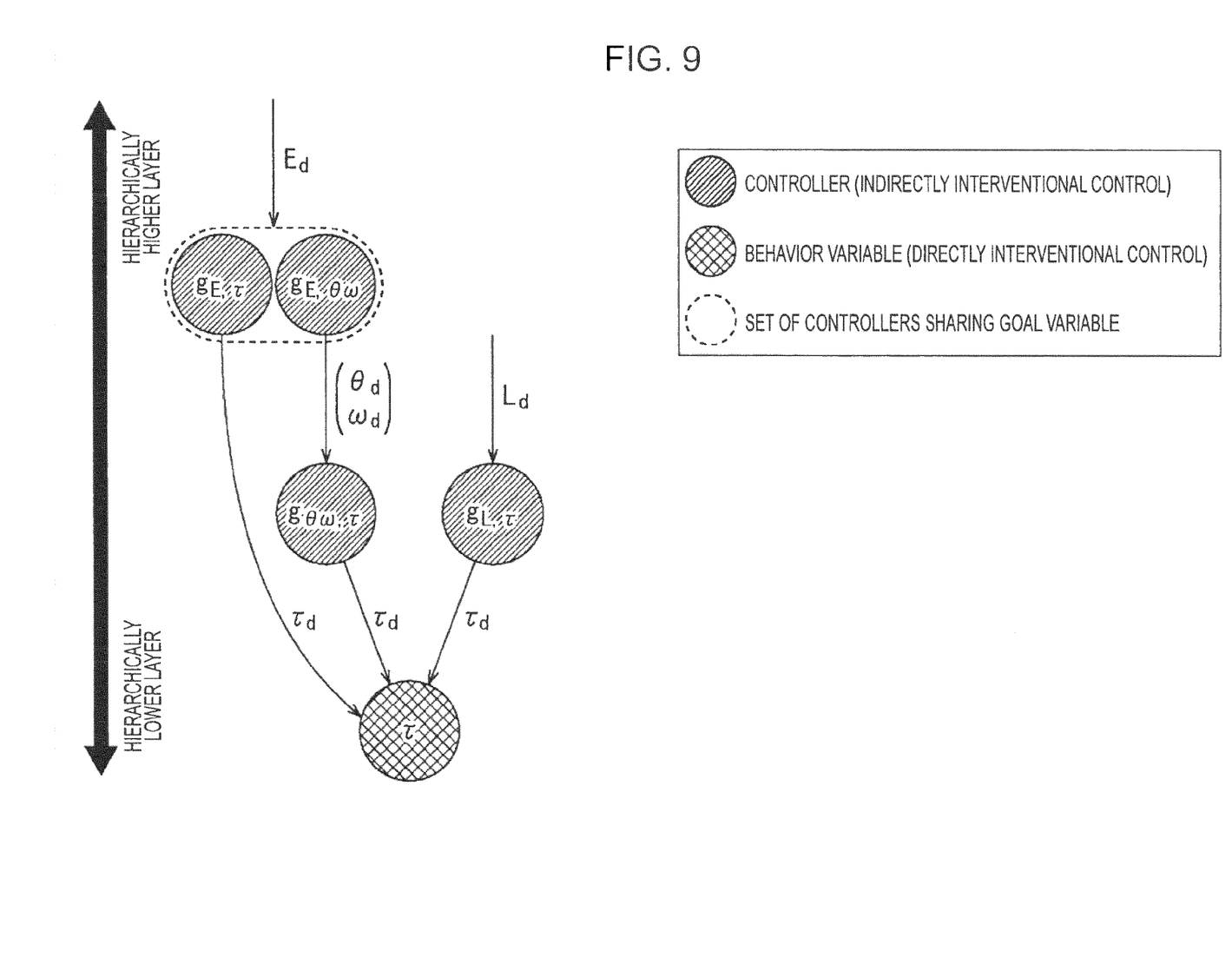
FIG. 9 illustrates a controller that is modularized and layered by an autonomous controller.

FIG. 8 illustrates the state variable of the autonomous agent 1.

The controllers are represented by the following equations (7). Equations (7) employ a format in which a subscript of the function g of the controller includes a variable to be controlled and a behavior variable with a comma interposed therebetween for delimitation. For example, the $\theta\omega$ controller having torque $\tau$ as a behavior variable is represented by $g_{\theta\omega,\tau}$, the E controller having an angle $\theta$ and an angular velocity $\omega$ is represented by $g_{E,\theta\omega}$. Each variable with a subscript d is a goal variable rather than a variable representing an observed value. Since control is performed through indirect intervention, the variable with the subscript d represents a goal value. However, since $\tau_d$ is a directly intervenable behavior variable, $\tau_d$ can be regarded as $\tau$.

$$\tau_d = g_{\theta\omega,\tau}\left(\begin{pmatrix}\theta_d\\\omega_d\end{pmatrix}, \begin{pmatrix}\theta\\\omega\end{pmatrix}\right) \quad (7)$$

$$\begin{pmatrix}\theta_d\\\omega_d\end{pmatrix} = g_{E,\theta\omega}\left(E_d, \begin{pmatrix}\theta\\\omega\end{pmatrix}\right)$$

$$\tau_d = g_{E,\tau}\left(E_d, \begin{pmatrix}\theta\\\omega\end{pmatrix}\right)$$

$$\tau_d = g_{L,\tau}(L_d)$$

Left-hand sides of equations (7) represent behavior variables, and are goal values at a hierarchically lower layer in view of layering. If this concept is used to arrange input and output variables of the controller, variables to be controlled and behavior variables of a plurality of controllers g are linked. As a whole, the controllers g are layered. More specifically, behavior variables at a hierarchically higher layer is a variable to be controlled at a hierarchically lower layer.

Figure 10:
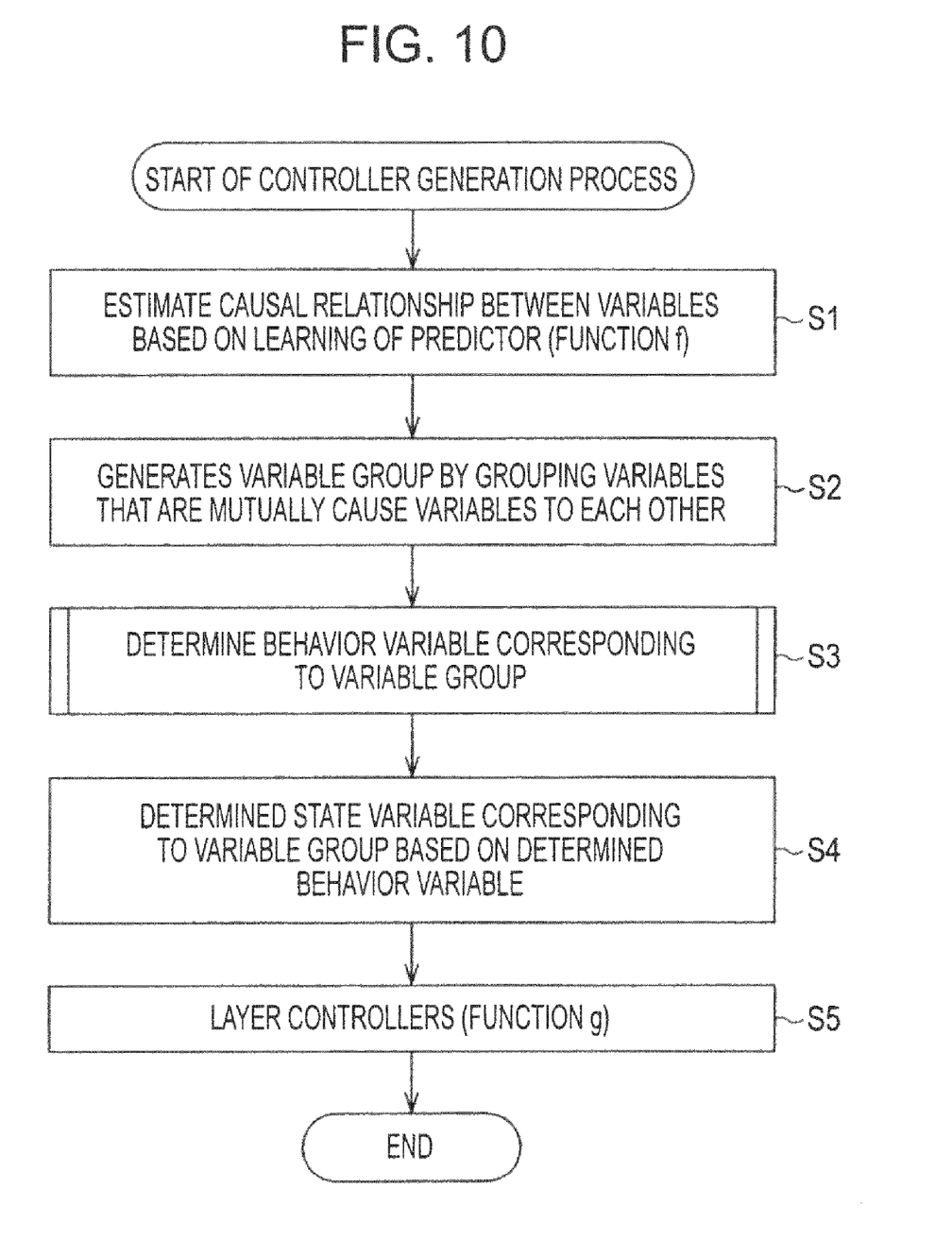
FIG. 10 is a flowchart illustrating a process of the autonomous controller.

The process of the autonomous controller 36 described above is organized with reference to a flowchart of FIG. 10. In step S1, the predictor learner 41 acquires the differential equations (1) through learning each of the variables ($\theta$, $\omega$, E, L, $\tau$), and outputs the differential equations (1) to each of the variable group generator 42, the behavior variable determiner 43, and the state variable determiner 44. In step S2, in accordance with the differential equations (1) acquired by the predictor learner 41, the variable group generator 42 groups variables, mutually cause variables to each other, from among the variables ($\theta$, $\omega$, E, L, $\tau$), and outputs the variable group to each of the behavior variable determiner 43 and the state variable determiner 44. In step S3, the behavior variable determiner 43 determines behavior variables in response to the differential equations (1) acquired by the predictor learner 41 and the variable groups determined by the variable group generator 42, and outputs the behavior variable to the state variable determiner 44.

Figure 11:
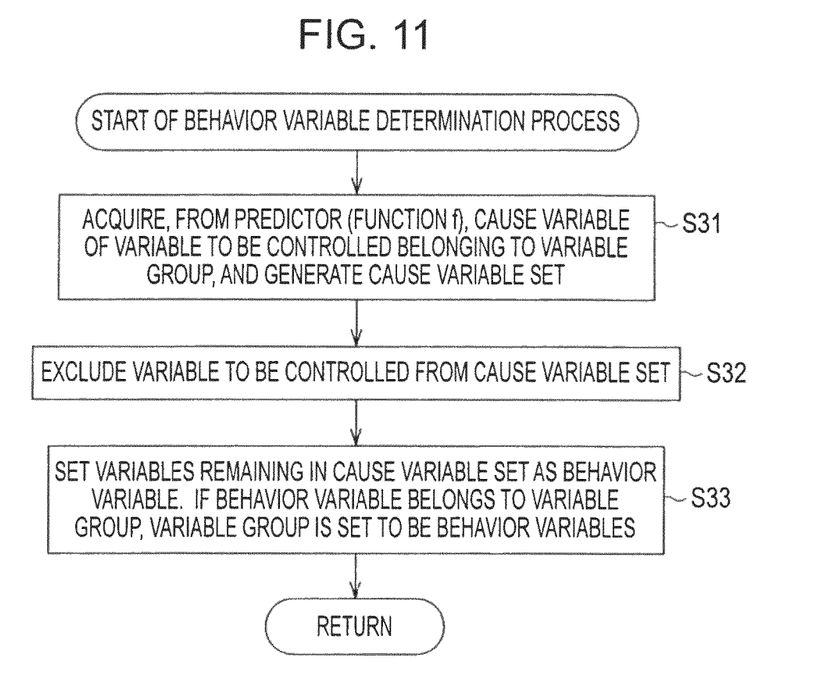
FIG. 11 is a flowchart illustrating a process in step S3 of FIG. 10.

The process in step S3 is described below in more detail with reference to FIG. 11. In step S31, the behavior variable determiner 43 acquires the cause variable of the variable to be controlled belonging to the variable group, and generates the cause variable set. In step S32, the behavior variable determiner 43 excludes, from the cause variable set, the variable to be controlled. In step S33, the behavior variable determiner 43 determines the variables remaining in the cause variable set as the behavior variables. If the behavior variable belongs to the variable group, all variables belonging to the variable group are determined as being the behavior variables.

Returning now back to FIG. 10, in step S4, the state variable determiner 44 determines a state variable corresponding to each variable group based on the differential equations (1) acquired by the predictor learner 41, the variable groups determined by the variable group generator 42, and the behavior variables determined by the behavior variable determiner 43. The state variable determiner 44 outputs the state variable together with the behavior variable to the layering unit 45. In step S5, the layering unit 45 generates a controller corresponding to a combination of the variable group and the behavior variable in accordance with the behavior variable and the state variable of the variable group, and layers the generated controllers. The process of the autonomous controller 36 has been discussed.

Figure 12:
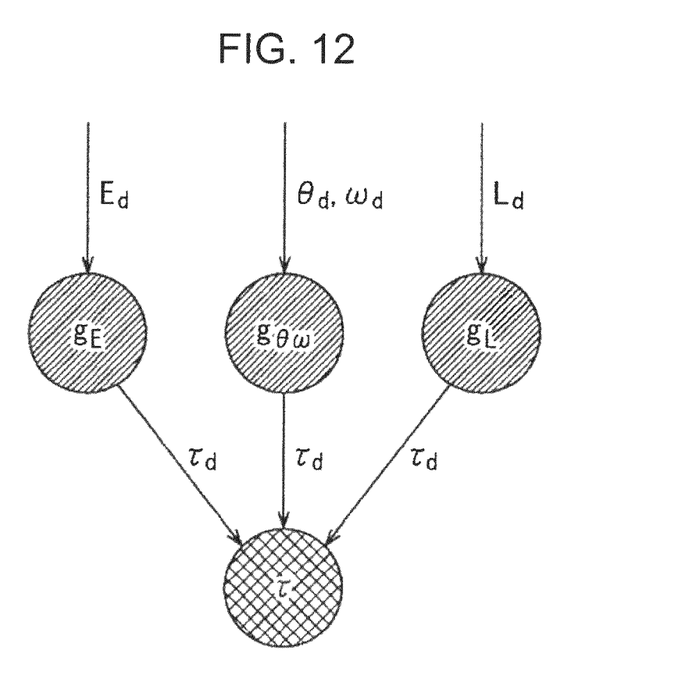
FIG. 12 illustrates the structure of a known controller.

If the method of the embodiment of the present invention is not used, the controller is represented by equations (8). The controller is illustrated in FIG. 12.

$$\tau_d = g_{\theta\omega,\tau}\left(\begin{pmatrix}\theta_d\\\omega_d\end{pmatrix}, \theta, \omega, E, L\right) \quad (8)$$

$$\tau_d = g_{E,\tau}(E_d, \theta, \omega, E, L)$$

$$\tau_d = g_{L,\tau}(L_d, \theta, \omega, E, L)$$

The behavior variable of each controller is limited to torque $\tau$ which is directly intervenable. The state variables cannot be identified as to which variable is unnecessary. As a result, all variables are used. In this case, the variables to be controlled are grouped into three variable groups of $\{\theta, \omega\}$, E and L based on the assumption that engineers has designed the variables to be controlled.

In comparison of equations (7) with equations (8), the number of input variables per function in equations (7) is smaller than the number of variables per function in equations (8). The number of variables increases as the autonomous agent 1 becomes complex in structure and enhanced in performance, and learning of equations (8) is thus expected to be difficult because of the "curse of dimensionality".

In contrast, with the embodiment of the present invention, the number of inputs to the controller is not increased as long as the causal relationship estimated by the predictor is disperse. In a typical practice, to avoid such a problem, humans design the input and output of the controller by determining the relationship.

The features of the present invention are listed below.

The autonomous agent composed of a plurality of functional modules estimates a causal relationship among the variables including a sensor, an internal state, and a motor. The causal relationship refers to information that identifies which value needs to be referenced (in the determination of a cause) to predict a future value of a predetermined variable (in the determination of an effect). The relationship between the cause and effect is represented by a 1 to n (n is an integer equal to 0 or larger) map.

The autonomous learning agent automatically determines an combination method of the number of functional modules and functions assigned to the functional modules using the automatically estimated causal relationship.

The functional module is also referred to as a controller, and has a function to vary the values of the variables, such as the sensor and the internal state, to goal values (or goal time-series values). The controller is a function having multiple inputs and outputs.

If a plurality of variables are cause variable to each other, that plurality of variables is regarded as a variable group (vector) representing a combined and inseparable state. The variable group is further generalized. More specifically, the variable group contains a plurality of variables and even a single variable that has not been grouped is also referred to as a variable group.

The number of and the functions of controllers are automatically determined. More specifically, the controllers of the number equal to the number of variable groups are generated. The functions of the controllers are to vary the value of each variable group to a requested value.

The output of the controller (another variable to be varied to control the variable to be controlled) is automatically determined. More specifically, the variable as the cause of the variable to be controlled is set to be as the output of the controller in the causal relationship of the variables.

The input of the controller (another variable needed to be referenced to control the variable to be controlled) is automatically determined. More specifically, the variable as the cause for the variable to be controlled and the variable representing the goal value are set to be inputs to the controller in the causal relationship of the variables.

To determine whether the future value of one variable (effect variable) can be predicted using another variable (0 or more), a combination of a plurality of input variables (cause variables) is assumed, and then learned. The cause variable and effect variable are identified using a hypothesis providing a minimum predictive error.

Each predictor is present on a per variable basis. A single predictor receives a plurality of input variables as a variable of a current state, and predicts another variable value as a future state.

In the known machine learning, a human as a designer designs a relationship between the functional modules in a machine taking into consideration a problem the human wants the machine to learn. Without this process, the machine cannot solve the problem in practice. With the embodiments of the present invention, the human is freed from this process. More specifically, problem setting, which is an indispensable function to an open-ended autonomous robot, is automatically performed.

In accordance with the embodiments of the present invention, the functions are divided among the controllers according to the meaning of the variable group. The controllers can thus learn independently of each other. Additional learning on a per function basis is possible without destroying another function. Without human intervention, a new behavior is acquired without destroying behaviors acquired in the past.

The present invention provides a clear solution to the "binding problem of the brain" left unresolved, namely, a problem of a connectivity rule among functional modules.

The present invention provides a simple but important basis for automatically solving the problem of the "curse of dimensionality", which is a serious problem in many fields.

The series of process steps of the above-described autonomous controller 36 can be performed in hardware or software. If the series of process steps is performed in software, a program forming the software can be installed from a recording medium to a computer built in dedicated hardware or a general-purpose personal computer 60 of FIG. 13 that performs a variety of functions when a variety of programs are installed thereon.

Figure 13:
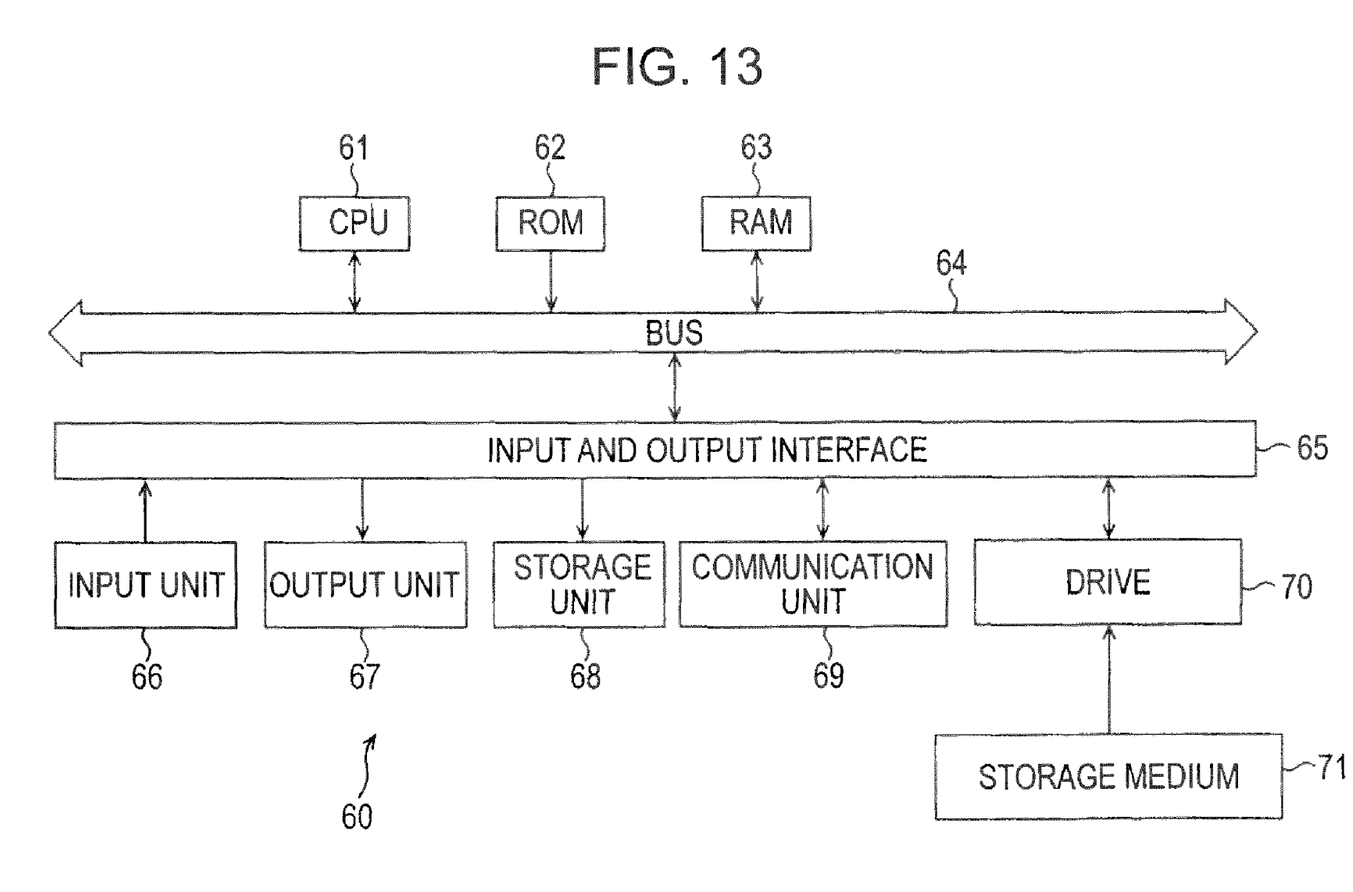
FIG. 13 is a block diagram illustrating a general-purpose personal computer.

The personal computer 60 includes a central processing unit (CPU) 61. The CPU 61 connects to an input and output interface 65 via a bus 64. The bus 64 connects to a read-only memory (ROM) 62 and a random-access memory (RAM) 63.

The input and output interface 64 connects to an input unit 66 including input devices, such as a keyboard receiving an operational command from a user, and a mouse, an output unit 67 including displays such as a cathode ray tube and a liquid-crystal display (LCD) displaying a video signal, a storage unit 68 including a hard disk drive storing programs and a variety of data, and a communication unit 69, including a modem, a local-area network (LAN) adaptor, etc. performing a communication process with a network such as the Internet. A drive 70 connects to a storage medium 71 including one of a magnetic disk (flexible disk), an optical disk (such as compact disk read only memory (CD-ROM), a digital versatile disk (DVD), or the like), a magneto-optical disk (such as Mini Disk (MD®), and a semiconductor memory.

The program for causing the personal computer 60 to perform the above-described series of process steps is supplied in the storage medium 71 to the personal computer 60. The program is then read and installed onto a hard disk in the storage unit 68 by the drive 70. The program installed on the storage medium 68 is loaded onto the RAM 63 for execution in response to a command of the CPU 16 when a user enters a command to the input unit 66.

The process steps of the program are executed in the time-series order stated herein. Alternatively, the process steps may be executed in parallel or separately.

It should be understood by those skilled in the art that various modifications, combinations, sub-combinations and alterations may occur depending on design requirements and other factors insofar as they are within the scope of the appended claims or the equivalents thereof.

What is claimed is:

1. A learning control apparatus including a plurality of functional modules configured to receive at least one variable and to output at least one variable, the learning control apparatus comprising:
   determining means for determining, based on plural causal relationships of a plurality of variables, a variable to be controlled as an input variable of each of the plurality of functional modules and a behavior variable as an output variable of each of the plurality of functional modules; and
   layering means for layering the plurality of functional modules by linking a first functional module of the plurality of functional modules and a second functional module of the plurality of functional modules, the second functional module including a behavior variable that is the same as a variable to be controlled by the first functional module.

2. The learning control apparatus according to claim 1, further comprising:
   estimating means for generating information representing the plural causal relationships of the plurality of variables.

3. The learning control apparatus according to claim 2, wherein the estimating means generates the information representing the plural causal relationships by selecting a combination having a minimum predictive error from among combinations of variables as inputs.

4. The learning control apparatus according to claim 1, further comprising:
 means for grouping the plurality of variables into a plurality of variable groups by the plural causal relationships of the plurality of variables; and
 constructing the functional modules on each variable to be controlled, corresponding to each of the plurality of variable groups.

5. The learning control apparatus according to claim 1, wherein the determining means determines a state variable as the input variable of each of the plurality of functional modules.

6. A learning control method for a learning control apparatus including a plurality of functional modules configured to receive at least one variable and to output at least one variable, the learning control method comprising:
 determining, by the learning control apparatus and based on plural causal relationships of a plurality of variables, a variable to be controlled as an input variable of each of the plurality of functional modules and a behavior variable as an output variable of each of the plurality of functional modules; and
 layering the plurality of functional modules by linking a first functional module of the plurality of functional modules and a second functional module of the plurality of functional modules, the second functional module including a behavior variable that is the same as a variable to be controlled by the first functional module.

7. A learning control apparatus including a plurality of functional modules configured to receive at least one variable and to output at least one variable, the learning control apparatus comprising:
 a processor configured:
  to determine, based on plural causal relationships of a plurality of variables, a variable to be controlled as an input variable of each of the plurality of functional modules and a behavior variable as an output variable of each of the plurality of functional modules; and
  to layer the plurality of functional modules by linking a first functional module of the plurality of functional modules and a second functional module of the plurality of functional modules, the second functional module including a behavior variable that is the same as a variable to be controlled by the first functional module.

* * * * *